United States Patent
Shimada

(10) Patent No.: US 8,368,718 B2
(45) Date of Patent: Feb. 5, 2013

(54) DISPLAY DEVICE, IMAGE FORMING APPARATUS, DISPLAY METHOD, AND STORAGE MEDIUM STORING PROGRAM THEREFOR

(75) Inventor: Bungo Shimada, Tokyo (JP)

(73) Assignee: Canon Kabushiki Kaisha (JP)

( * ) Notice: Subject to any disclaimer, the term of this patent is extended or adjusted under 35 U.S.C. 154(b) by 832 days.

(21) Appl. No.: 12/502,471

(22) Filed: Jul. 14, 2009

(65) Prior Publication Data

US 2010/0007921 A1 Jan. 14, 2010

(30) Foreign Application Priority Data

Jul. 14, 2008 (JP) ................. 2008-182721

(51) Int. Cl.
*G09G 5/00* (2006.01)
(52) U.S. Cl. ..................... 345/619; 345/684
(58) Field of Classification Search .............. 345/619, 345/684
See application file for complete search history.

(56) References Cited

U.S. PATENT DOCUMENTS

2007/0097025 A1* 5/2007 Itoh et al. ............. 345/50

FOREIGN PATENT DOCUMENTS

| JP | 62-065528 A | 3/1987 |
| JP | 06-334800 A | 12/1994 |
| JP | 2003-084893 A | 3/2003 |
| JP | 2003-140798 A | 5/2003 |
| JP | 2004-023492 A | 1/2004 |

* cited by examiner

*Primary Examiner* — Maurice L McDowell, Jr.
(74) *Attorney, Agent, or Firm* — Rossi, Kimms & McDowell LLP

(57) ABSTRACT

A display device capable of informing a user of a plurality of condition information items correctly even if a display area is restricted. A determination unit determines whether a plurality of conditions should be displayed on a display unit. A first display unit displays the condition information items showing the respective conditions to be displayed in turn in contracted messages, which are created by contracting the respective condition information items so as to be fitted within a display area of the display unit, when the determination unit determines that the plurality of conditions should be displayed. A second display unit displays the condition information item showing the condition to be displayed in a detailed message, which does not contract the condition information item, when the determination unit determines that one condition should be displayed.

14 Claims, 7 Drawing Sheets

FIG.9

| DETAILED MESSAGE (400) | NUMBER OF CHARACTERS | CONTRACTED MESSAGE (401) | NUMBER OF CHARACTERS |
|---|---|---|---|
| COPY START KEY | 14 | — | 0 |
| Reading | 7 | — | 0 |
| Printing | 8 | — | 0 |
| Toner is low. | 13 | — | 0 |
| Paper out. | 10 | — | 0 |
| Please check contact glass. | 27 | Check contact glass. | 20 |
| Blacks/Cyan toners are low. Please prepare toners. | 50 | Prepare B/C tonners. | 20 |
| Fixing unit is faulty. Please call service. | 44 | Fixing unit fault. | 18 |
| FAX is receiving. | 17 | — | 0 |

DISPLAY DEVICE, IMAGE FORMING APPARATUS, DISPLAY METHOD, AND STORAGE MEDIUM STORING PROGRAM THEREFOR

BACKGROUND OF THE INVENTION

1. Field of the Invention

The present invention relates to a display device, an image forming apparatus provided with the display device, a display method, and a storage medium storing a program therefor.

2. Description of the Related Art

In order to display progressing conditions of operations on a display unit of which display area is restricted, there is a technique that divides the display area of the display unit and displays a plurality of operation conditions in the divided areas when the operations are being executed (for example, see Japanese laid-open patent publication (Kokai) No. H6-334800 (JP6-334800A)).

However, in the display technique disclosed in the above-mentioned patent publication, since each area that displays one condition becomes narrow due to the division of the display area, there is a problem that a user cannot grasp a current phenomenon easily.

SUMMARY OF THE INVENTION

The present invention provides a display device, an image forming apparatus and s storage medium that are capable of informing a user of a plurality of condition information items correctly even if a display area is restricted.

Accordingly, a first aspect of the present invention provides a display device displaying a condition information item that shows a condition of the device on a display unit, comprising a determination unit adapted to determine whether a plurality of conditions should be displayed on the display unit, a first display unit adapted to display the condition information items showing the respective conditions to be displayed in turn in contracted messages, which are created by contracting the respective condition information items so as to be fitted within a display area of the display unit, when the determination unit determines that a plurality of conditions should be displayed, and a second display unit adapted to display the condition information item showing the condition to be displayed in a detailed message, which does not contract the condition information item, when the determination unit determines that one condition should be displayed.

Accordingly, a second aspect of the present invention provides an image forming apparatus displaying a condition information item that shows a condition of the apparatus on a display unit, comprising a determination unit adapted to determine whether a plurality of conditions should be displayed on the display unit, a first display unit adapted to display the condition information items showing the respective conditions to be displayed in turn in contracted messages, which are created by contracting the respective condition information items so as to be fitted within a display area of the display unit, when the determination unit determines that a plurality of conditions should be displayed, and a second display unit adapted to display the condition information item showing the condition to be displayed in a detailed message, which does not contract the condition information item, when the determination unit determines that one condition should be displayed.

Accordingly, a third aspect of the present invention provides a display method displaying a condition information item that shows a condition of a device on a display unit, comprising a determination step of determining whether a plurality of conditions should be displayed on the display unit, a first display step of displaying the condition information items showing the respective conditions to be displayed in turn in contracted messages, which are created by contracting the respective condition information items so as to be fitted within a display area of the display unit, when it is determined that a plurality of conditions should be displayed in the determination step, and a second display step of displaying the condition information item showing the condition to be displayed in a detailed message, which does not contract the condition information item, when it is determined that one condition should be displayed in the determination step.

Accordingly, a fourth aspect of the present invention provides a computer readable storage medium storing a control program executing a display method displaying a condition information item that shows a condition of a device on a display unit, the display method comprising a determination step of determining whether a plurality of conditions should be displayed on the display unit, a first display step of displaying the condition information items showing the respective conditions to be displayed in turn in contracted messages, which are created by contracting the respective condition information items so as to be fitted within a display area of the display unit, when it is determined that a plurality of conditions should be displayed in the determination step, and a second display step of displaying the condition information item showing the condition to be displayed in a detailed message, which does not contract the condition information item, when it is determined that one condition should be displayed in the determination step.

According to the present invention, a plurality of condition information items can be informed intelligibly and correctly even if a display area is restricted.

The features and advantages of the invention will become more apparent from the following detailed description taken in conjunction with the accompanying drawings.

BRIEF DESCRIPTION OF THE DRAWINGS

FIG. 9 is a view showing a list of the status condition information items.

DESCRIPTION OF THE PREFERRED EMBODIMENTS

Hereafter, embodiments according to the present invention will be described in detail with reference to the drawings.

Figure 1:
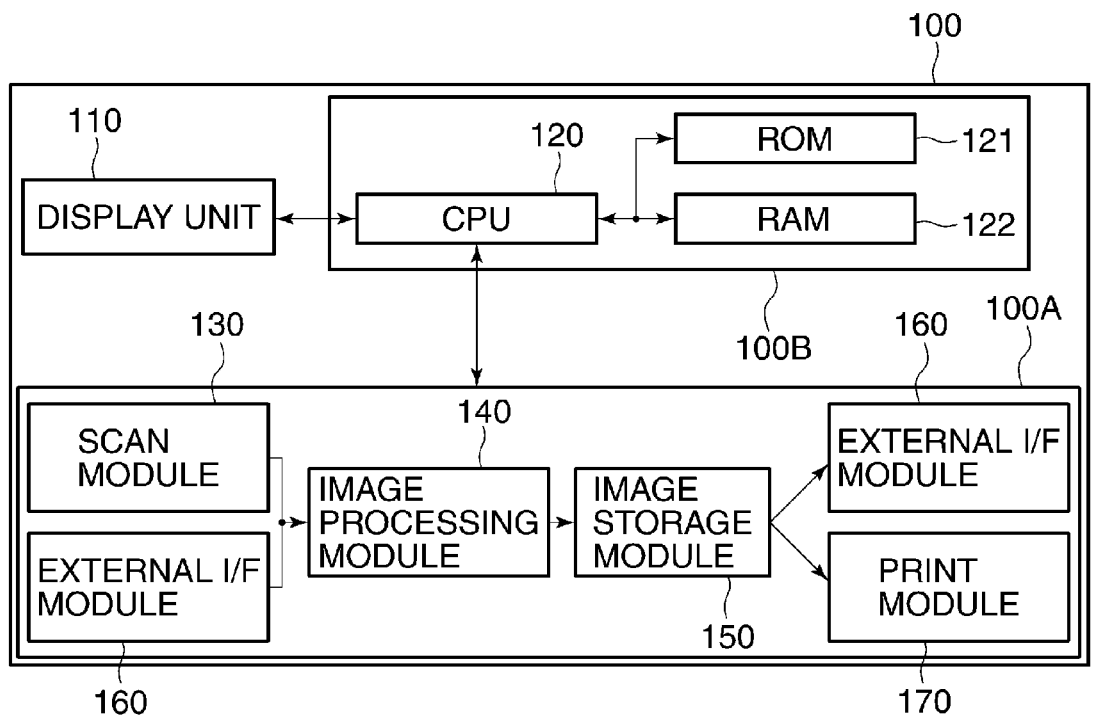
FIG. 1 is a block diagram of a copier as an image forming apparatus according to an embodiment of the present invention.

FIG. 1 is a block diagram of a copier as an image forming apparatus (a display device) according to an embodiment of the invention. In FIG. 1, arrows among blocks represent flows of data and instructions.

The copier 100 is provided with a copy unit 100A, a display unit 110 that has an operating function, and a control unit 100B that controls the other units. The display unit 110 notifies a user of information and transfers a user instruction to the control unit 100B.

The copy unit 100A is provided with the following modules. A scan module 130 reads an original and outputs an image to the module at the later stage. An image processing module 140 executes image processing for the image read by the scan module 130 and for data inputted from an external I/F module 160 mentioned later.

An image storage module 150 records the image, which has been processed by the image processing module 140, and its property. The external I/F module 160 transmits an image to the exterior of the copier 100 and inputs data from the exterior. A print module 170 prints an image.

Although the scan module 130 and the print module 170 are configured to be included in the copier 100 in this block diagram, one or both of the modules may be configured to stand outside.

The control unit 100B is provided with a CPU 120 that controls the copy unit 100A and the display unit 110 by executing a program, a ROM 121 that stores the program executed by the CPU 120 and messages displayed on the display unit 110 by the CPU 120, and a RAM 122 on which the program is developed when the CPU 120 executes the program. It should be noted that the control unit 100B also functions as a display device that controls the display unit 110.

Figure 2:
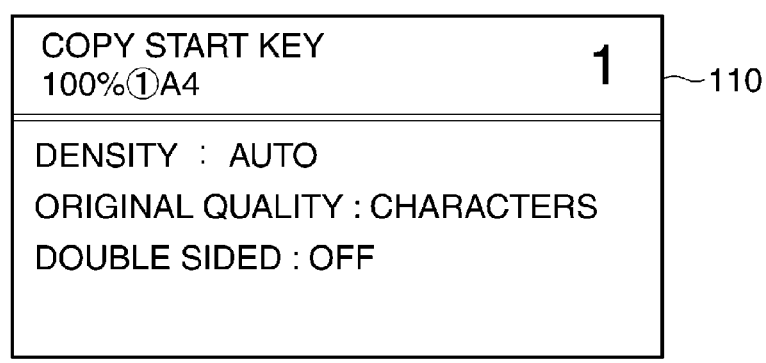
FIG. 2 is a view showing an example of an indication on a display unit in FIG. 1.
Figure 3:
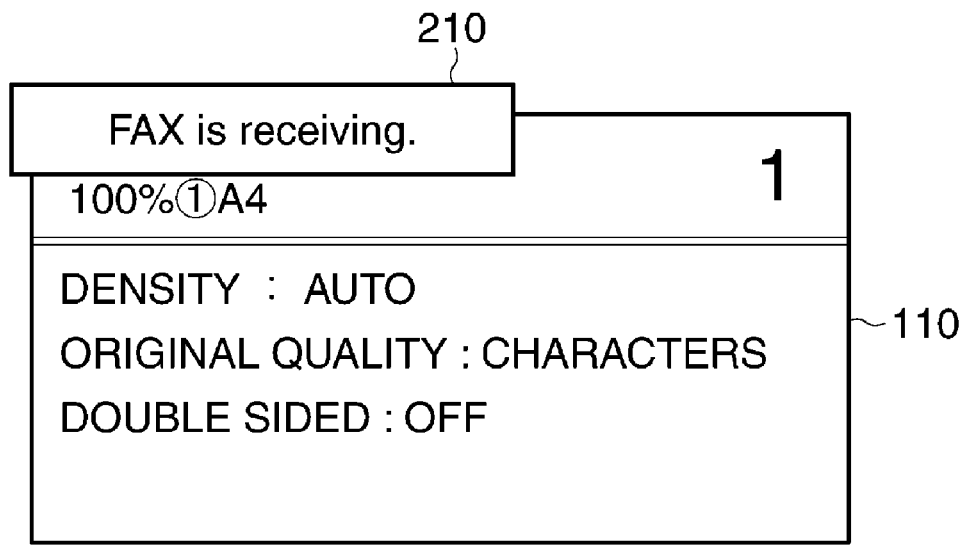
FIG. 3 is a view showing a status display area of the display unit in FIG. 1.

FIG. 2 is a view showing an example of an indication of the display unit 110 in FIG. 1. FIG. 3 is a view showing a status display area 210 of the display unit 110 in FIG. 1.

In FIG. 3, the status condition information item (a message thereof) that will be described referring to FIG. 9 later is displayed in the status display area 210, which displays the condition of the copier 100, to notify a user. In the embodiment, the status display area 210 has a space in which twenty-two alphanumeric characters can be displayed.

Figure 4:
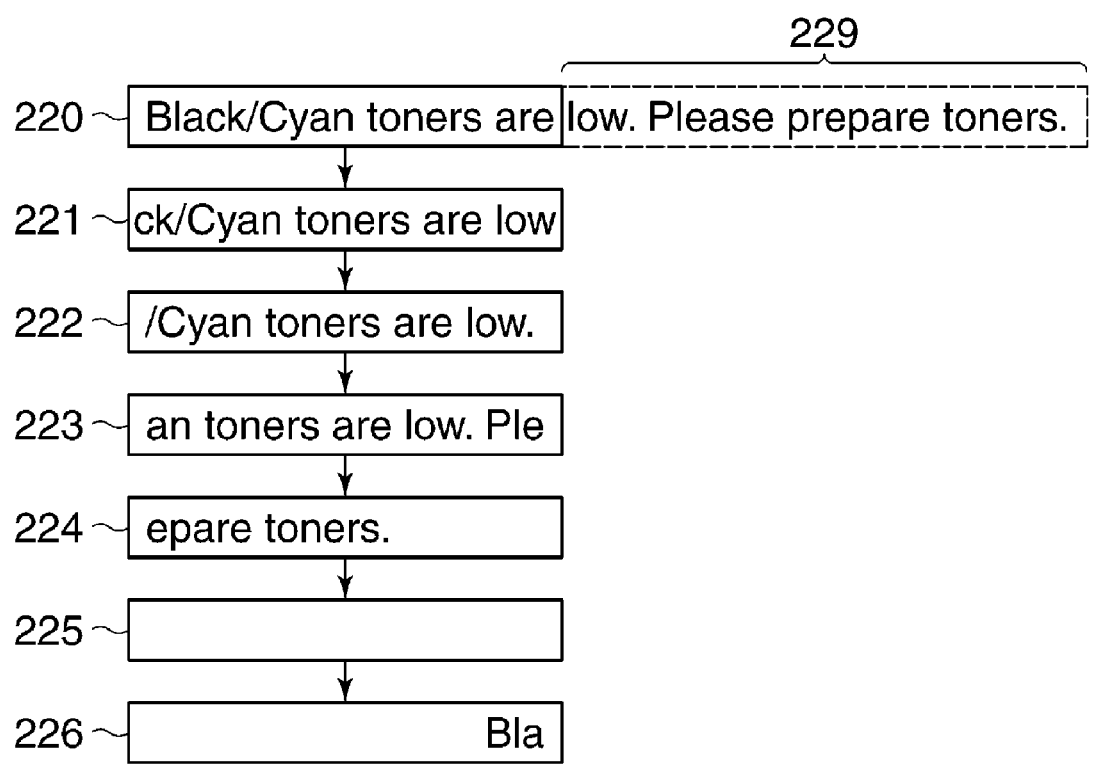
FIG. 4 is a view showing an example displaying a long message of a status condition information item in the status display area of FIG. 3 by rolling characters.

FIG. 4 is a view showing an example displaying a long message of a status condition information item in the status display area 210 of FIG. 3 by rolling characters.

First twenty-two characters of a long message 220 of "Blacks/Cyan toners are low. Please prepare toners." can be displayed first. Since the remaining characters 229 cannot be displayed by one indication, they are displayed using a rolling character displaying technique.

The different but partially overlapped portions 221 through 224 of the message are displayed sequentially as if to scroll the message from the right to the left gradually. Since a condition 225 that displays no characters has come finally, the message is repeatedly displayed from the beginning as shown in a condition 226. These controls enable to inform a user of the long message of the status condition information item.

Figure 5:
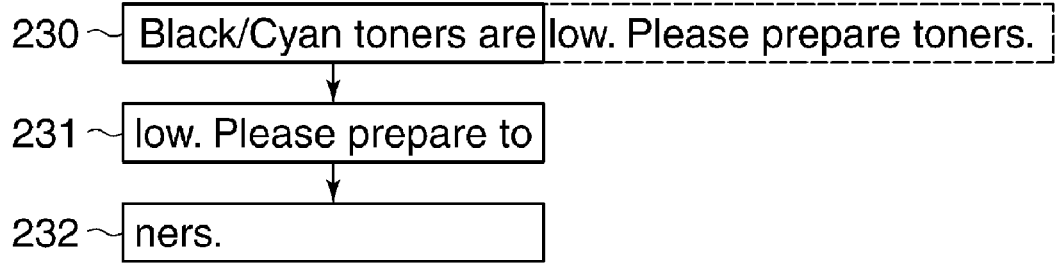
FIG. 5 is a view showing a first example displaying the long message of the status condition information item in the status display area of FIG. 3 by dividing the message and displaying the divided parts by a toggle indication.

FIG. 5 is a view showing a first example displaying the long message of the status condition information item in the status display area 210 of FIG. 3 by dividing the message and displaying the divided parts by a toggle indication.

In contrast to FIG. 4, the long message of the status condition information item is given by dividing the long message and displaying the divided parts by the toggle indication.

First twenty-two characters of a long message 230 of "Blacks/Cyan toners are low. Please prepare toners." can be displayed first. Since the remaining characters 239 cannot be displayed by one indication, they are divided into two message parts 231 and 232 and the message parts are displayed by the toggle indication in order to give the whole message to a user.

Figure 6:
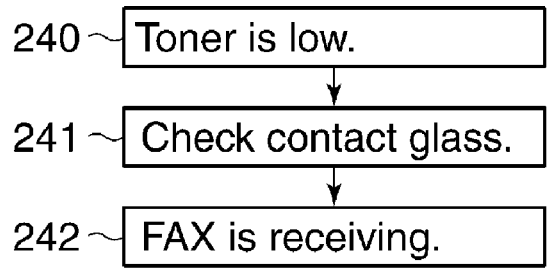
FIG. 6 is a view showing a display example in the status display area of FIG. 3 when the copier has a plurality of status condition information items that should be given to a user.

FIG. 6 is a view showing a display example in the status display area 210 of FIG. 3 when the copier 100 has a plurality of status condition information items that should be given to a user.

The following contents are displayed in order to notify a user of three conditions including a toner low condition, an abnormal condition of a contact glass, and a FAX reception.

That is, three messages including a message 240 of "Toner is low.", a message 241 of "Check contact glass.", and a message 242 of "FAX is receiving." are displayed in the status display area 210 in turn.

This enables to notify a user of the status condition information items that are generated at the same time.

Figure 7:
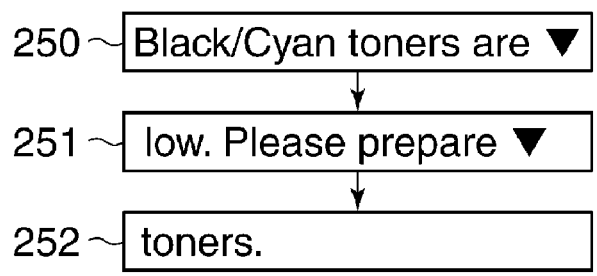
FIG. 7 is a view showing a second example displaying the long message of the status condition information item in the status display area of FIG. 3 by dividing the message and displaying the divided parts by a toggle indication.

FIG. 7 is a view showing a second example displaying the long message of the status condition information item in the status display area 210 of FIG. 3 by dividing the message and displaying the divided parts by the toggle indication.

In contrast to FIG. 5, when the long message is divided into message parts 250, 251, and 252 and they are displayed by the toggle indication, each of the divided message parts 250 and 251 includes a symbol (solid-black downward triangular mark) showing the toggle indication.

Accordingly, a user can understand that the long message of the status condition information item is divided and displayed. First twenty-one characters of a long message 230 of "Blacks/Cyan toners are low. Please prepare toners." can be displayed first.

Since the symbols (solid-black downward triangular marks) showing that the message has been divided are inserted at the ends of the message parts, the number of characters in each message part is less than that of the displaying method in FIG. 5 by one character. The long message 230 is displayed by dividing into three message parts 250 through 252, as mentioned above.

First Embodiment

Figure 8:
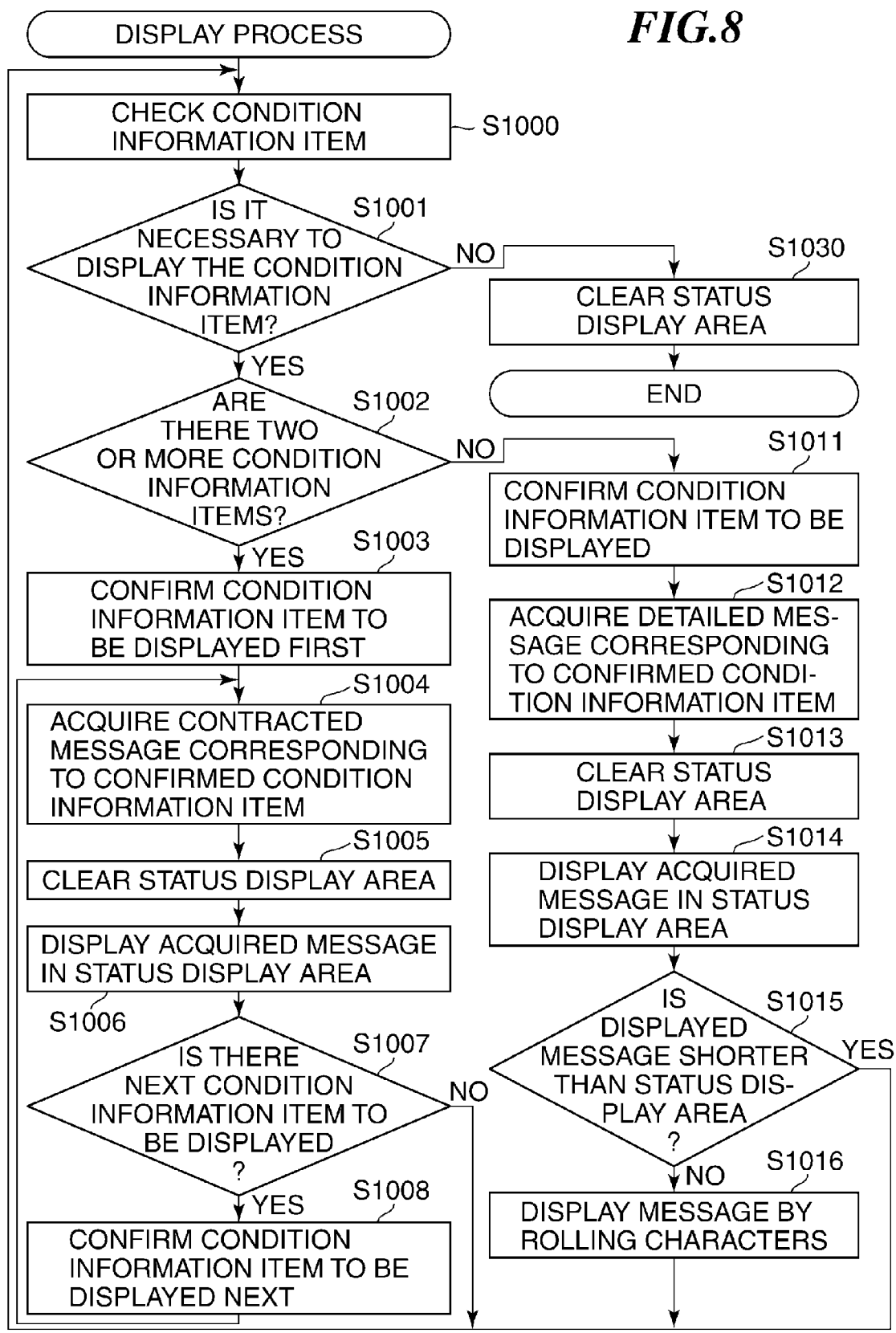
FIG. 8 is a flowchart showing a first embodiment of a message display process for displaying a message of the status condition information item executed by the image forming apparatus (the display device) of FIG. 1.

FIG. 8 is a flowchart showing a first embodiment of a message display process for displaying a message of the status condition information item executed by the image forming apparatus of FIG. 1.

This process is executed when the message of the status condition information item (it may only be referred as condition information item, hereinafter) is displayed in the status display area 210 of the display unit 110. This process is executed by the CPU 120 at a time of a condition change of the copier 100 or at a fixed interval of time.

First, the CPU 120 checks the condition information item in step S1000. Next, the CPU 120 proceeds with the process to step S1001 and checks whether it is necessary to display the condition information item.

When it is necessary to inform a user of certain information, for example, when a print job or the like is being executed or when a toner is low, the process proceeds to step S1002. When it is unnecessary to display, the process proceeds to step S1030. The status display area 210 is cleared in step S1030. When the process finishes, the CPU 120 gets out from the flowchart.

In step S1002, the CPU 120 checks whether there are two or more condition information items that should be displayed. When there are two or more condition information items that should be given to a user, the process proceeds to step S1003, otherwise the process proceeds to step S1011.

The step S1002 functions as the determination unit that determines whether there are two or more conditions that should be displayed on the display unit 110.

In step S1003, the CPU 120 confirms the condition information item that will be displayed first. Next, the CPU 120 acquires a contracted message 401 corresponding to the confirmed condition information item in step S1004. The details of the contracted message 401 and a detailed message 400 will be described later with reference to FIG. 9.

The CPU 120 proceeds with the process to step S1005 after the process in step S1004, and clears the status display area 210 on which a message will be displayed from now on. And the CPU 120 displays the acquired message in the status display area 210 in step S1006.

The step S1006 functions as the first display unit that displays the condition information items showing the respective conditions concerned to be displayed in a first display format when the determination unit determines that a plurality of conditions should be displayed. Here, the condition information item in the first display format is the contracted message 401 that is created by contracting a detailed message of the status condition information item so as to be fitted within the status display area 210 of the display unit 110.

In step S1007, the CPU 120 determines whether there is the next condition information item that should be displayed. When the next condition information item to be displayed exists, the process proceeds to step S1008, and when it does not exist, the process returns back to step S1000.

In step S1008, the CPU 120 confirms the condition information item that will be displayed next, and then the process returns to step S1004. The execution of the flowchart from this step S1003 to step S1008 enables the toggle indication of a plurality of condition information items as shown in FIG. 6.

In step S1011, the CPU 120 confirms the condition information item to be displayed. Next, the CPU 120 acquires the detailed message 400 corresponding to the confirmed condition information item in step S1012.

The CPU 120 proceeds with the process to step S1013 after the process in step S1012, and clears the status display area 210 on which a message will be displayed from now on. And the CPU 120 displays the acquired message in the status display area 210 in step S1014. In this case, when the message acquired in step S1012 is longer than twenty-two characters, first twenty-two characters of the message are displayed.

The step S1014 functions as the second display unit that displays the condition information item showing the condition concerned to be displayed in a second display format when the determination unit determines that one condition should be displayed. Here, the condition information item in the second display format is the detailed message 400 created without contracting the status condition information items.

Next, the CPU 120 determines whether the message displayed in step S1014 has been fitted within the status display area 210 in step S1015. When the message has been fitted within the status display area 210 and the whole message has been given to a user by one indication, the process returns to step S1000.

When the message has not been fitted within the status display area 210, the process proceeds to step S1016. In step S1016, the CPU 120 displays the message acquired in step S1012 in the status display area 210 by rolling characters. After finishing the rolling character indication, the process returns to step S1000. This process realizes the indication as shown in FIG. 4.

FIG. 9 is a view showing the list of the status condition information items. The messages that show the status condition information items of the copier 100 shown in FIG. 9 are stored in the ROM 121. The messages include the detailed message 400 and the corresponding contracted message 401. When the detailed message 400 exceeds twenty-two characters, the contracted message 401 that shows the same content is stored.

The contracted message 401 certainly consists of twenty-two or less characters so as to be fitted within the status display area 210. When the detailed message 400 consists of twenty-two or less characters, the detailed message 400 is also used as the contracted message 401.

The above-described embodiment enables to correctly inform a user of the status condition information items generated simultaneously, without narrowing the display area used for displaying one message. Specifically, when it is enough to display only one message, the message is given using the detailed message by rolling characters. Accordingly, the user can know the condition information item correctly.

On the other hand, when it is necessary to display a plurality of messages, the messages are given using the contracted messages 401. Since a user can be notified of one condition by one indication, the user can be notified of the whole conditions of three messages by three screen indications, for example. At the occasion of the notification of a plurality of condition information items, a user can be notified of a plurality of condition information items easily in a short period of time because the rolling characters, which are easy to understand but take long time to display, are not used.

Second Embodiment

Figure 10:
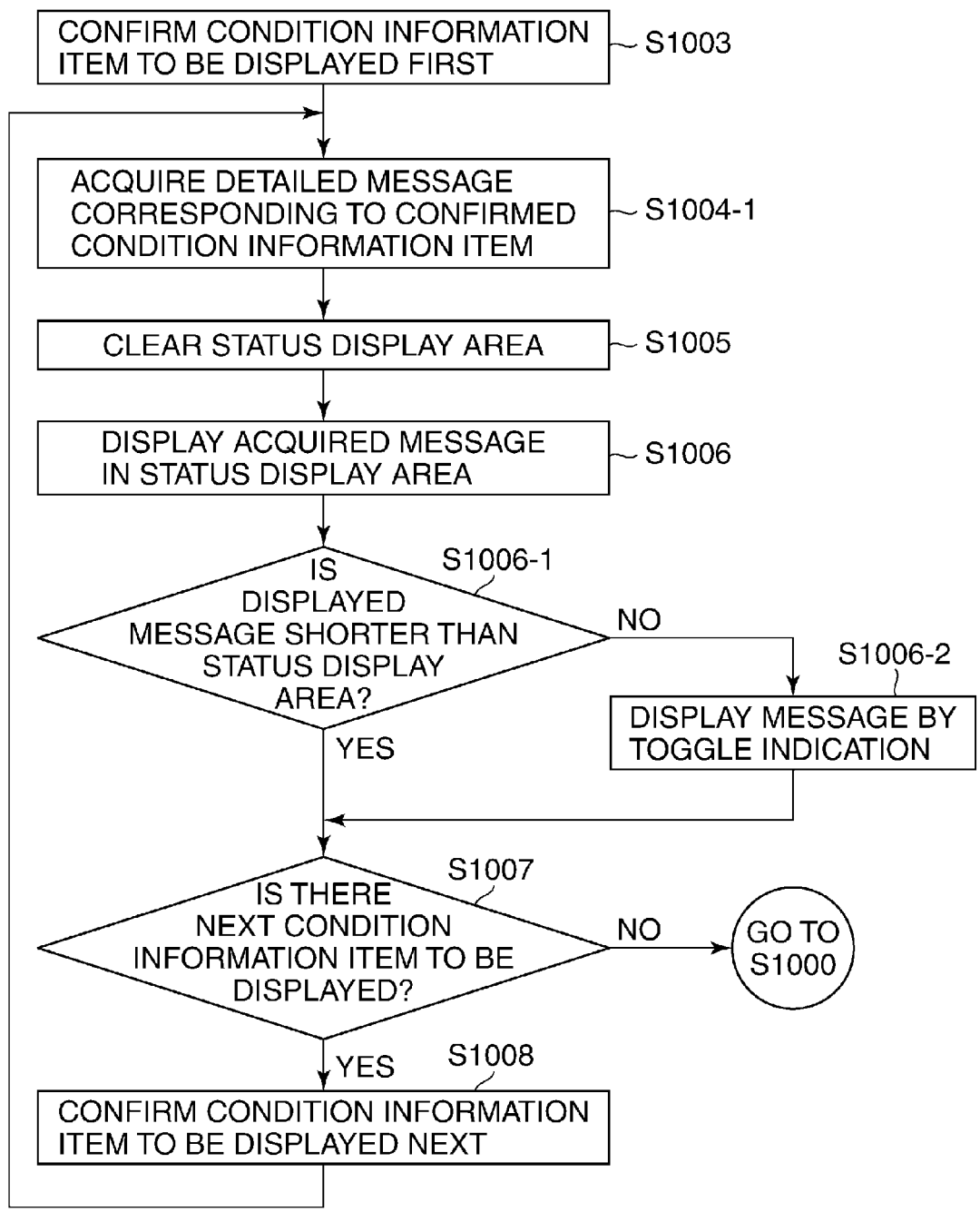
FIG. 10 is a flowchart showing a main portion of a second embodiment of a message display process for displaying a message of the status condition information item executed by the image forming apparatus (the display device) of FIG. 1.

FIG. 10 is a flowchart showing a main portion of a second embodiment of the message display process for displaying the status condition information item executed by the image forming apparatus (the display device) of FIG. 1.

The flowchart of FIG. 10 is transposed to step S1008 from step S1003 of the flowchart of FIG. 8. That is, the flowchart of FIG. 10 shows a variation of the indication in the case where it is determined that there are a plurality of condition information items to be displayed. Concrete changed parts will be described below. It should be noted that the process of the other part is identical with that of the flowchart of FIG. 8.

It should be noted that, in the above-mentioned first embodiment, the first display format means that the contracted messages are displayed by the toggle indication, and the second display format means that the detailed message is displayed by one indication or is displayed by rolling characters when the detailed message is long. On the other hand, in the second embodiment, the first display format means that a plurality of detailed messages are displayed by the toggle indication and each detailed message is displayed by the toggle indication when the detailed message is long. And the second display format means that the detailed message is displayed by one indication or is displayed by rolling characters when the detailed message is long.

In step S1003, the CPU 120 confirms the condition information item that will be displayed first. Next, the CPU 120 proceeds with the process to step S1004-1 and acquires the detailed message 400 corresponding to the confirmed condition information item.

The CPU 120 proceeds with the process to step S1005 after the process in step S1004-1, and clears the status display area 210 on which a message will be displayed from now on. And the CPU 120 displays the acquired message in the status display area 210 in step S1006. In this case, when the message acquired in step S1004-1 is longer than twenty-two characters, first twenty-two characters of the message are displayed.

Next, the CPU 120 determines whether the message displayed in step S1006 has been fitted within the status display area 210 in step S1006-1. When the message has been fitted within the status display area 210 and the whole message has been given to a user by one indication, the process proceeds to step S1007.

When the message has not been fitted within the status display area 210, the process proceeds to step S1006-2 (the second display unit). In step S1016-2, the CPU 120 divides the message acquired in step S1004-1 and displays the divided parts by the toggle indication as shown in FIG. 5. After finishing the toggle indication, the process proceeds to step S1007. This process realizes the indication as shown in FIG. 5.

On the other hand, in the above-mentioned display process, the detail message may be divided into twenty-one character units rather than twenty-two character units in order to insert a symbol of "downward triangular mark" showing that the message has been divided at the end of each character unit. This process realizes the indication as shown in FIG. 7

The above-described embodiment enables to correctly inform a user of the status condition information items generated simultaneously, without narrowing the status display area 210 used for displaying one message. Specifically, when it is enough to display only one message, the message is given using the detailed message by rolling characters. Accordingly, the user can know the condition information item correctly.

On the other hand, when it is necessary to display a plurality of messages, the long messages are divided and displayed. Since the content of each message given when a plurality of messages are given is identical with that given when one message is given (a length of message is not changed), a user can easily understand each of the condition information items when the user is notified of a plurality of condition information items. Such a display control eliminates the need to have two (detailed and contracted) messages corresponding to one condition as with the first embodiment.

Third Embodiment

Figure 11:
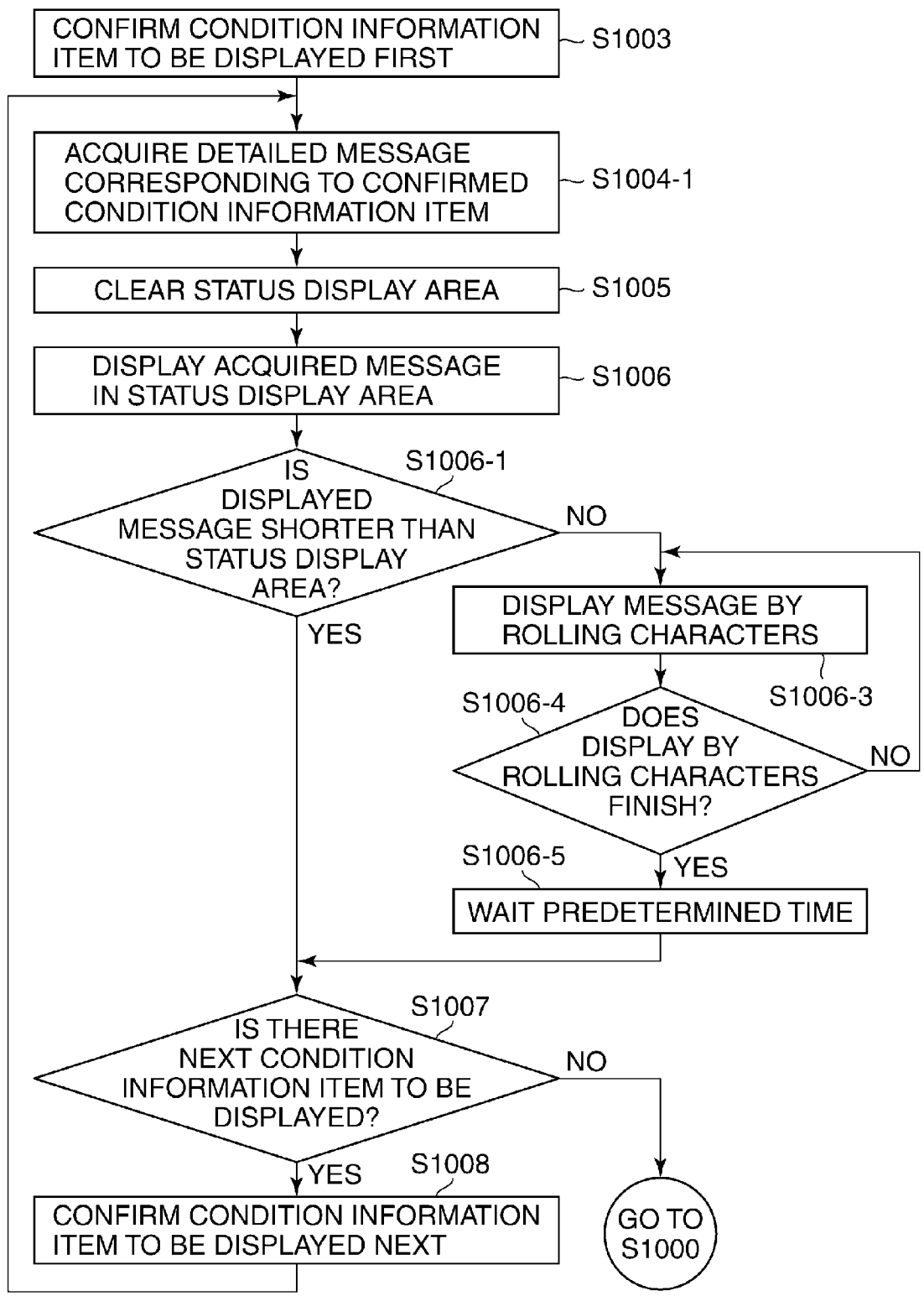
FIG. 11 is a flowchart showing a main portion of a third embodiment of a message display process for displaying a message of the status condition information item executed by the image forming apparatus (the display device) of FIG. 1.

FIG. 11 is a flowchart showing a main portion of a third embodiment of the message display process for displaying the status condition information item executed by the image forming apparatus (the display device) of FIG. 1.

The flowchart of FIG. 11 is transposed to step S1008 from step S1003 of the flowchart of FIG. 8. That is, the flowchart of FIG. 11 shows a variation of the indication in the case where it is determined that there are a plurality of condition information items to be displayed. Concrete changed parts will be described below. It should be noted that the process of the other part is identical with that of the flowchart of FIG. 8.

The same step number is attached to the same process as in FIG. 10, and a duplicated description is omitted.

In the third embodiment, the first display format means that a plurality of detailed messages are displayed by the toggle indication and each detailed message is displayed by rolling characters so as not to be overlapped with another detailed message when the detailed message is long. And the second display format means that the detailed message is displayed by one indication or is displayed by rolling characters when the detailed message is long.

The CPU 120 determines whether the message displayed in step S1006 has been fitted within the status display area 210 in step S1006-1. When the message has been fitted within the status display area 210 and the whole message has been given to a user by one indication, the process proceeds to step S1007.

When the message has not been fitted within the status display area 210, the process proceeds to step S1006-3. In step S1006-3, the CPU 120 displays the message acquired in step S1004-1 in the status display area 210 by rolling characters.

Next, the CPU 120 determines whether the display by rolling characters is finished in step S1006-4. When the display by rolling characters is finished, the progress proceeds to step S1006-5. When it is not finished, the process returns to step S1006-3 and the display by rolling characters is continued. In step S1006-5, the CPU 120 waits for a predetermined time, and proceeds with the process to step S1007.

The above-described embodiment enables to correctly inform a user of the status condition information items generated simultaneously, without narrowing the status display area 210 used for displaying one message. Specifically, when a plurality of messages need to be displayed, the messages of the respective status condition information items are displayed by rolling characters. When the display by rolling characters is finished, the predetermined time is waited for, and then the next message is displayed.

Such a display control eliminates the need to have two (detailed and contracted) messages corresponding to one condition as with the first embodiment. In spite of the number of characters for rolling, the next message can be displayed after the display by rolling characters of the current message has been certainly completed. Therefore, even if the message includes large number of characters, the indication problem where the message is switched before the current message has not been completed can be avoided.

Other Embodiments

It is to be understood that the object of the present invention may also be accomplished by supplying a system or an apparatus with a storage medium in which a program code of software which realizes the functions of the above described embodiment is stored, and causing a computer (or CPU or MPU or the like) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM, and the like. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments and it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-182721, filed on Jul. 14, 2008, which is hereby incorporated by reference herein in its entirety.

What is claimed is:

1. A display device for displaying a condition information item that shows a condition of the device on a display unit, the device comprising:
a control unit programmed to provide:
a determination task that determines whether a plurality of conditions should be displayed on the display unit;
a first display task that displays, when the determination task determines that a plurality of conditions should be displayed, the condition information items showing the respective conditions to be displayed in contracted messages, which are created by contracting the respective condition information items to fit within a display area of the display unit,
wherein the first display task displays the contracted messages one by one in turn; and
a second display task that displays, when the determination task determines that one condition should be displayed, the condition information item showing the condition to be displayed in a detailed message, which does not contract the condition information item,
wherein the second display task displays the detailed message by rolling characters when the detailed message is not fitted within the display area.

2. A display device for displaying a condition information item that shows a condition of the device on a display unit, the device comprising:
a control unit programmed to provide:
a determination task that determines whether a plurality of conditions should be displayed on the display unit;
a first display task that displays the condition information items showing the respective conditions to be displayed in turn in contracted messages, which are created by contracting the respective condition information items so as to be fitted within a display area of the display unit, when the determination task determines that a plurality of conditions should be displayed; and
a second display task that displays the condition information item showing the condition to be displayed in a detailed message, which does not contract the condition information item, when the determination task determines that one condition should be displayed,
wherein the second display task displays the detailed message by a toggle indication when the detailed message is not fitted within the display area.

3. A display device for displaying a condition information item that shows a condition of the device on a display unit, the device comprising:
a control unit programmed to provide:
a determination task that determines whether a plurality of conditions should be displayed on the display unit;
a first display task that displays, when the determination task determines that a plurality of conditions should be displayed, the condition information items showing the respective conditions to be displayed in detailed messages, which do not contract the condition information items for the respective conditions,
wherein the first display task displays each detailed message by a toggle indication when the detailed massage is not fitted within the display area; and
a second display task that displays, when the determination task determines that one condition should be displayed, the condition information item showing the condition to be displayed in a detailed message, which does not contract the condition information item,
wherein the second display task displays the detailed message by rolling characters when the detailed message is not fitted within the display area.

4. The display device according to claim 3, wherein the first display task displays the condition information items with a symbol showing the toggle indication, respectively.

5. A display device for displaying a condition information item that shows a condition of the device on a display unit, the device comprising:
a control unit programmed to provide:
a determination task that determines whether a plurality of conditions should be displayed on the display unit;
a first display task that displays, when the determination task determines that a plurality of conditions should be displayed, the condition information items showing the respective conditions to be displayed in detailed messages, which do not contract the condition information items for the respective conditions,
wherein the first display task displays each detailed message by rolling characters when the detailed massage is not fitted within the display area, and changes, after the display of one of the detailed messages by rolling characters has been finished, the display to the next detailed message by rolling characters; and
a second display task that displays, when the determination task determines that one condition should be displayed, the condition information item showing the condition to be displayed in a detailed message, which does not contract the condition information item,
wherein the second display task displays the detailed message by rolling characters when the detailed message is not fitted within the display area.

6. An image forming apparatus for displaying a condition information item that shows a condition of the apparatus on a display unit, the apparatus comprising:
a control unit programmed to provide:
a determination task that determines whether a plurality of conditions should be displayed on the display unit;
a first display task that displays, when the determination task determines that a plurality of conditions should be displayed, the condition information items showing the respective conditions to be displayed in contracted messages, which are created by contracting the respective condition information items to fit within a display area of the display unit,
wherein the first display task displays the contracted messages one by one in turn; and
a second display task that displays, when the determination task determines that one condition should be displayed, the condition information item showing the condition to be displayed in a detailed message, which does not contract the condition information item, wherein the second display task displays the detailed message by rolling characters when the detailed message is not fitted within the display area.

7. A display method of displaying, for a displaying device having a control unit, a condition information item that shows a condition of the device on a display unit, the method comprising:
- a determination step of determining whether a plurality of conditions should be displayed on the display unit;
- a first display step of displaying, when the determination step determines that a plurality of conditions should be displayed, the condition information items showing the respective conditions to be displayed in contracted messages, which are created by contracting the respective condition information items to fit within a display area of the display unit,
- wherein the first display task displays the contracted messages one by one in turn; and
- a second display step of displaying, when the determination step determines that one condition should be displayed, the condition information item showing the condition to be displayed in a detailed message, which does not contract the condition information item,
- wherein the second display step displays the detailed message by rolling characters when the detailed message is not fitted within the display area, and
- wherein the control unit executes the determination step, the first display step, and the second display step.

8. A non-transitory computer readable storage medium storing a control program executable by a control unit of a display device to execute a display method of displaying a condition information item that shows a condition of the device on a display unit, the method comprising:
- a determination step of determining whether a plurality of conditions should be displayed on the display unit;
- a first display step of displaying, when the determination step determines that a plurality of conditions should be displayed, the condition information items showing the respective conditions to be displayed in contracted messages, which are created by contracting the respective condition information items to fit within a display area of the display unit,
- wherein the first display task displays the contracted messages one by one in turn; and
- a second display step of displaying, when the determination step determines that one condition should be displayed, the condition information item showing the condition to be displayed in a detailed message, which does not contract the condition information item,
- wherein the second display step displays the detailed message by rolling characters when the detailed message is not fitted within the display area.

9. An image forming apparatus for displaying a condition information item that shows a condition of the apparatus on a display unit, the apparatus comprising:
- a control unit programmed to provide:
- a determination task that determines whether a plurality of conditions should be displayed on the display unit;
- a first display task that displays, when the determination task determines that a plurality of conditions should be displayed, the condition information items showing the respective conditions to be displayed in detailed messages, which do not contract the condition information items for the respective conditions,
- wherein the first display task displays each detailed message by a toggle indication when the detailed massage is not fitted within the display area; and
- a second display task that displays, when the determination task determines that one condition should be displayed, the condition information item showing the condition to be displayed in a detailed message, which does not contract the condition information item,
- wherein the second display task displays the detailed message by rolling characters when the detailed message is not fitted within the display area.

10. A display method of displaying, for an image forming apparatus having a control unit, a condition information item that shows a condition of the apparatus on a display unit, the method comprising:
- a determination step of determining whether a plurality of conditions should be displayed on the display unit;
- a first display step of displaying, when the determination step determines that a plurality of conditions should be displayed, the condition information items showing the respective conditions to be displayed in detailed messages, which do not contract the condition information items for the respective conditions,
- wherein the first display step displays each detailed message by a toggle indication when the detailed massage is not fitted within the display area; and
- a second display step of displaying, when the determination step determines that one condition should be displayed, the condition information item showing the condition to be displayed in a detailed message, which does not contract the condition information item,
- wherein the second display step displays the detailed message by rolling characters when the detailed message is not fitted within the display area, and
- wherein the control unit executes the determination step, the first display step, and the second display step.

11. A non-transitory computer readable storage medium storing a control program executable by a control unit of an image forming apparatus to execute a display method of displaying a condition information item that shows a condition of the apparatus on a display unit, the method comprising:
- a determination step of determining whether a plurality of conditions should be displayed on the display unit;
- a first display step of displaying, when the determination step determines that a plurality of conditions should be displayed, the condition information items showing the respective conditions to be displayed in detailed messages, which do not contract the condition information items for the respective conditions,
- wherein the first display step displays each detailed message by a toggle indication when the detailed massage is not fitted within the display area; and
- a second display step of displaying, when the determination step determines that one condition should be displayed, the condition information item showing the condition to be displayed in a detailed message, which does not contract the condition information item,
- wherein the second display step displays the detailed message by rolling characters when the detailed message is not fitted within the display area.

12. An image forming apparatus for displaying a condition information item that shows a condition of the apparatus on a display unit, the apparatus comprising:
- a control unit programmed to provide:
- a determination task that determines whether a plurality of conditions should be displayed on the display unit;

a first display task that displays, when the determination task determines that a plurality of conditions should be displayed, the condition information items showing the respective conditions to be displayed in detailed messages, which do not contract the condition information items for the respective conditions, wherein the first display task displays each detailed message by rolling characters when the detailed massage is not fitted within the display area, and changes, after the display of one of the detailed messages by rolling characters has been finished, the display to the next detailed message by rolling characters; and a second display task that displays, when the determination task determines that one condition should be displayed, the condition information item showing the condition to be displayed in a detailed message, which does not contract the condition information item, wherein the second display task displays the detailed message by rolling characters when the detailed message is not fitted within the display area.

13. A display method of displaying, for an image forming apparatus having a control unit, a condition information item that shows a condition of the apparatus on a display unit, the method comprising:

a determination step of determining whether a plurality of conditions should be displayed on the display unit;

a first display step of displaying, when the determination step determines that a plurality of conditions should be displayed, the condition information items showing the respective conditions to be displayed in detailed messages, which do not contract the condition information items for the respective conditions, wherein the first display step displays each detailed message by rolling characters when the detailed massage is not fitted within the display area, and changes, after the display of one of the detailed messages by rolling characters has been finished, the display to the next detailed message by rolling characters; and a second display step of displaying, when the determination step determines that one condition should be displayed, the condition information item showing the condition to be displayed in a detailed message, which does not contract the condition information item, wherein the second display step displays the detailed message by rolling characters when the detailed message is not fitted within the display area, and wherein the control unit executes the determination step, the first display step, and the second display step.

14. A non-transitory computer readable storage medium storing a control program executable by a control unit of an image forming apparatus to execute a display method of displaying a condition information item that shows a condition of the apparatus on a display unit, the method comprising:

a determination step of determining whether a plurality of conditions should be displayed on the display unit;

a first display step of displaying, when the determination step determines that a plurality of conditions should be displayed, the condition information items showing the respective conditions to be displayed in detailed messages, which do not contract the condition information items for the respective conditions, wherein the first display step displays each detailed message by rolling characters when the detailed massage is not fitted within the display area, and changes, after the display of one of the detailed messages by rolling characters has been finished, the display to the next detailed message by rolling characters; and a second display step of displaying, when the determination step determines that one condition should be displayed, the condition information item showing the condition to be displayed in a detailed message, which does not contract the condition information item, wherein the second display step displays the detailed message by rolling characters when the detailed message is not fitted within the display area.

* * * * *